(12) United States Patent
Fossati et al.

(10) Patent No.: US 7,736,798 B2
(45) Date of Patent: Jun. 15, 2010

(54) LID FOR BATTERIES AND A BATTERY INCLUDING THE LID

(75) Inventors: Giuseppe Fossati, Mozzanica (IT); Giordano Ferla, Capralba (IT)

(73) Assignee: Exide Italia S.R.L., Romano di Lombardia (Bergamo) (IT)

( * ) Notice: Subject to any disclaimer, the term of this patent is extended or adjusted under 35 U.S.C. 154(b) by 1026 days.

(21) Appl. No.: 11/388,119

(22) Filed: Mar. 23, 2006

(65) Prior Publication Data
US 2006/0263680 A1 Nov. 23, 2006

(30) Foreign Application Priority Data
Apr. 13, 2005 (IT) ............... TO05A0246

(51) Int. Cl.
*H01M 2/04* (2006.01)
*H01M 2/36* (2006.01)

(52) U.S. Cl. .................. 429/175; 429/72; 429/87
(58) Field of Classification Search ............. 429/72, 429/87, 175
See application file for complete search history.

(56) References Cited
U.S. PATENT DOCUMENTS
5,846,671 A * 12/1998 Stocchiero ............ 429/88

2004/0142231 A1 * 7/2004 Schellenberg et al. ......... 429/53

FOREIGN PATENT DOCUMENTS

| DE | 195 32 934 A1 | 3/1997 |
|----|---------------|--------|
| DE | 102 57 918 A1 | 6/2003 |
| EP | 0 560 703 | 3/1993 |
| EP | 0 763 862 | 3/1997 |
| EP | 1 341 244 | 9/2003 |
| EP | 1 427 050 A2 | 6/2004 |

* cited by examiner

*Primary Examiner*—Timothy C Vanoy
*Assistant Examiner*—Richard M Rump
(74) *Attorney, Agent, or Firm*—Merchant & Gould P.C.

(57) ABSTRACT

A lid for an accumulator battery includes a substantially flat main closure element for closing a container of the battery, in which closure element holes are formed, a secondary closure element which is mounted on the main element and in which there are plugs that are fitted in the holes, and a duct which is formed in the secondary element, is in flow communication with the holes, and is provided for the discharge of the gases that are generated inside the battery container. The main and secondary elements of the lid together form a box-like structure defining a chamber which is in flow communication with the holes and inside which the main and secondary elements are connected to one another by partitions that extend perpendicularly relative to the plane in which the main element extends and are arranged in a manner such as to define a labyrinth which connects the holes of the main element with the gas-discharge duct.

9 Claims, 6 Drawing Sheets

LID FOR BATTERIES AND A BATTERY INCLUDING THE LID

BACKGROUND OF THE INVENTION

The present invention relates to a lid for an accumulator battery, comprising a substantially flat main closure element for closing a container of the battery, in which closure element a plurality of holes is formed to afford access to the interior of the battery container, a secondary closure element which is mounted on the main element and in which there is a plurality of plugs that are fitted in the holes of the main element of the lid, and at least one duct which is formed in at least one of the main and secondary elements, is in flow communication with the holes, and is provided for the discharge of the gases that are generated inside the battery container.

SUMMARY OF THE INVENTION

The lid according to the invention is characterized in that the main and secondary elements together form a box-like structure defining a chamber which is in flow communication with the holes and inside which the main and secondary elements are connected to one another by a plurality of partitions that extend substantially perpendicularly relative to the plane in which the main element extends and are arranged in a manner such as to define a labyrinth which connects the holes of the main element with the gas-discharge duct.

A further subject of the invention is an accumulator battery, particularly a starter battery, comprising a plurality of cells in series and comprising the above-mentioned lid.

BRIEF DESCRIPTION OF THE DRAWINGS

Further characteristics and advantages of the invention will become clear from the following detailed description given with reference to the appended drawings which are provided purely by way of non-limiting example and in which.

DETAILED DESCRIPTION

The appended drawings refer, for simplicity, to a lid for conventional starter batteries that are generally constituted by six cells in series; clearly, however, the present invention is equally applicable to batteries that are constituted by any number of cells in series and also to batteries intended for uses other than starting.

Figure 1:
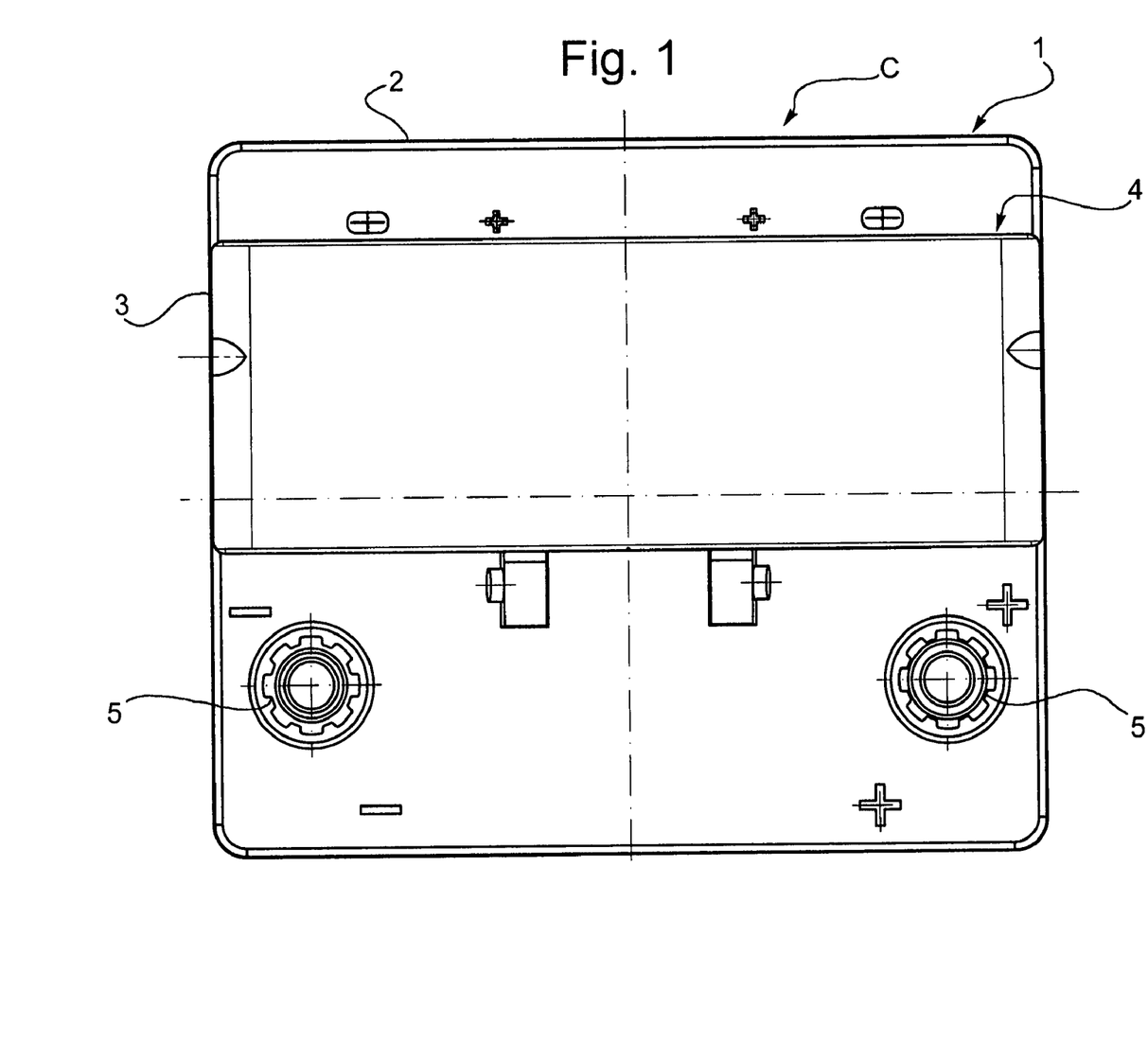
FIG. 1 is a plan view of a lid for a storage battery according to the invention.
Figure 2:
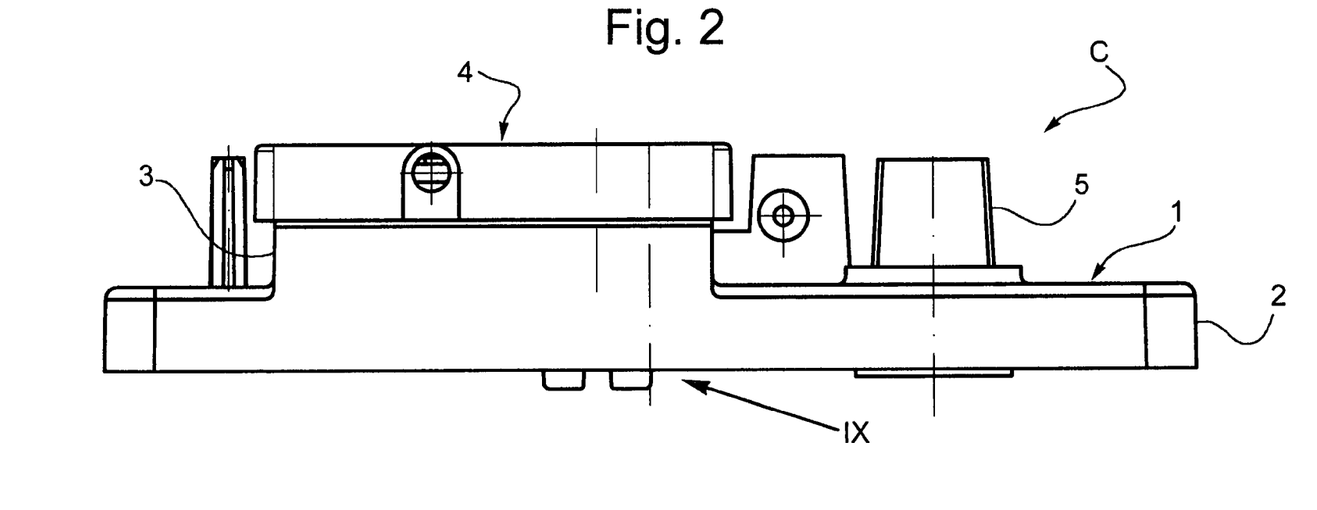
FIG. 2 is a side elevational view of the lid of FIG. 1.

In FIGS. 1 and 2, a lid for an accumulator battery is generally indicated C.

In the embodiment shown by way of example, the lid or lid unit C comprises a generally rectangular main lid 1 which has on its periphery a rim or flange 2 to be coupled in a leaktight manner with the upper edge of a battery container, not shown.

As can be seen in FIG. 2 in particular, in the embodiment shown, the lid 1 has a raised portion 3 on which a secondary lid 4 is mounted, both lids having a substantially rectangular shape as seen in plan. Two tubular elements 5 extend from the lower portion of the lid in the vicinity of the raised portion of the lid, defining ducts or seats for the positioning of respective battery terminals.

Figure 3:
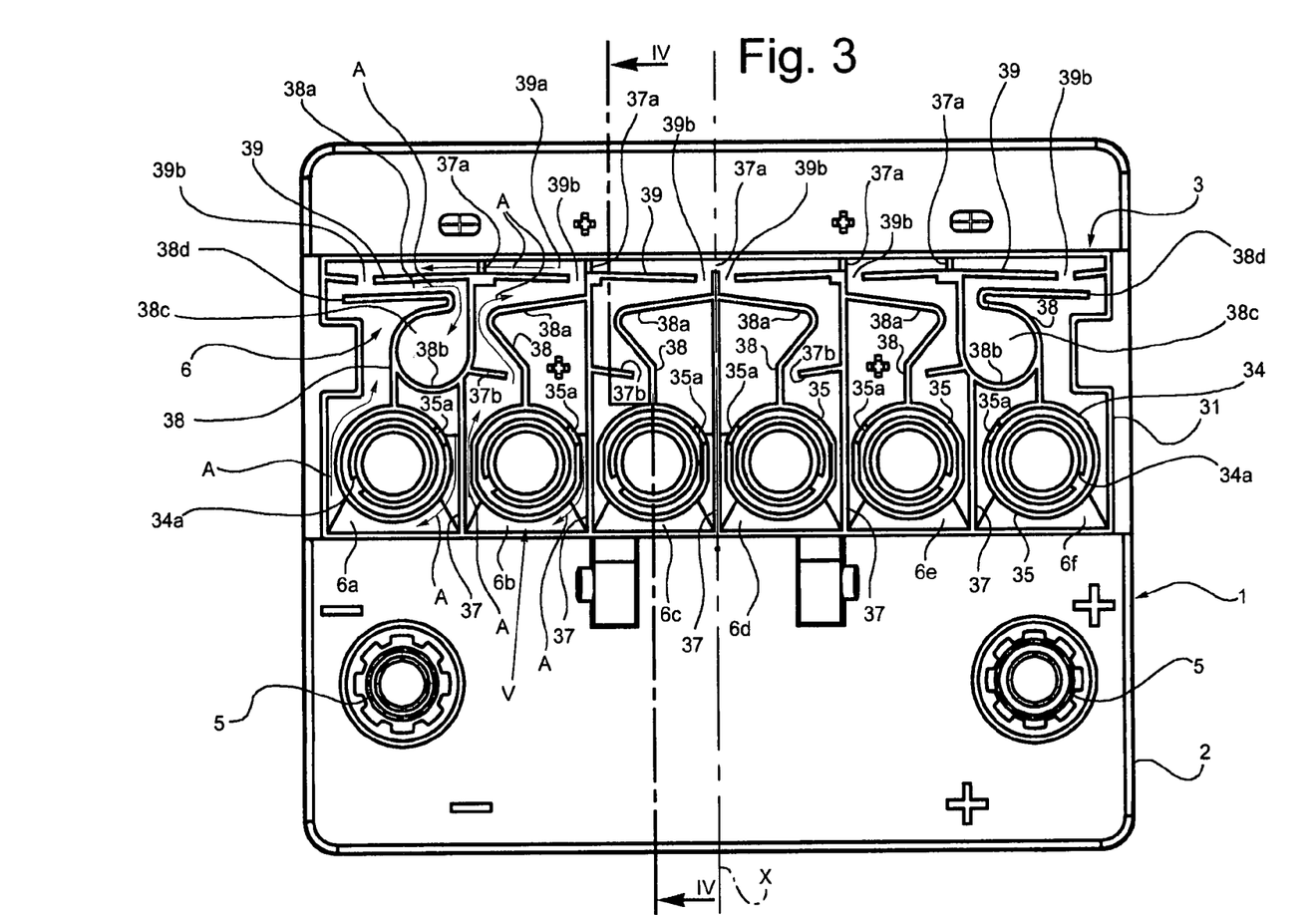
FIG. 3 is a plan view of a main element of the lid of FIG. 1, prior to the assembly of the lid.
Figure 6:
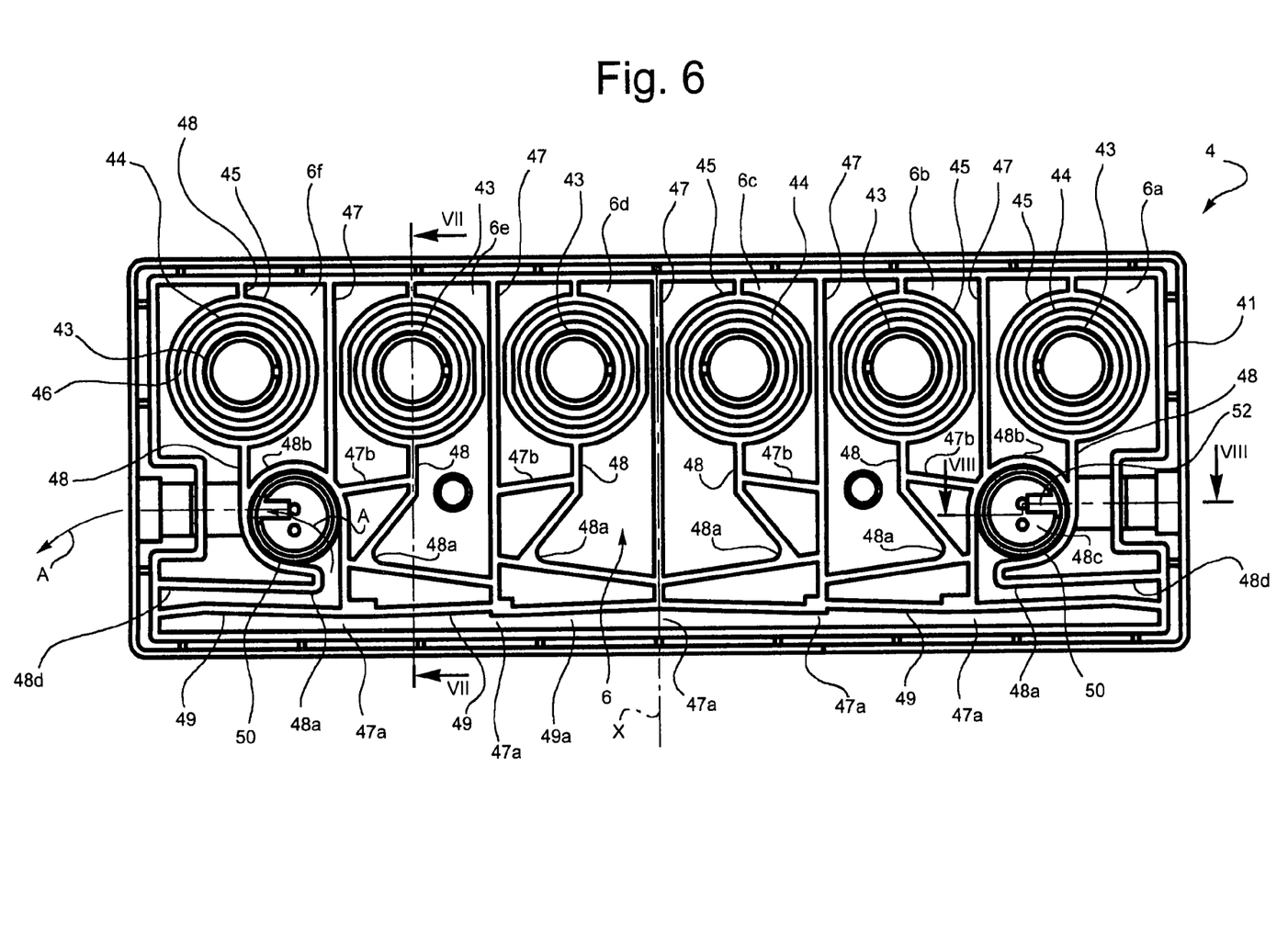
FIG. 6 is a plan view of the lower side of a secondary element of the lid of FIG. 1, prior to the assembly of the lid.

The secondary lid 4 forms, with the raised portion 3 of the main lid 1, a box-like structure in which the secondary lid 4 substantially forms an upper half-shell and the raised portion 3 forms a lower half-shell, the upper and lower half-shells being connected to one another, for example by heat-sealing, and defining an internal gas-collection chamber 6 (of which the lower portion is shown in FIG. 3 and the upper portion in FIG. 6).

The main lid 1 and the secondary lid 4 are advantageously produced by moulding of plastics materials.

Figure 4:
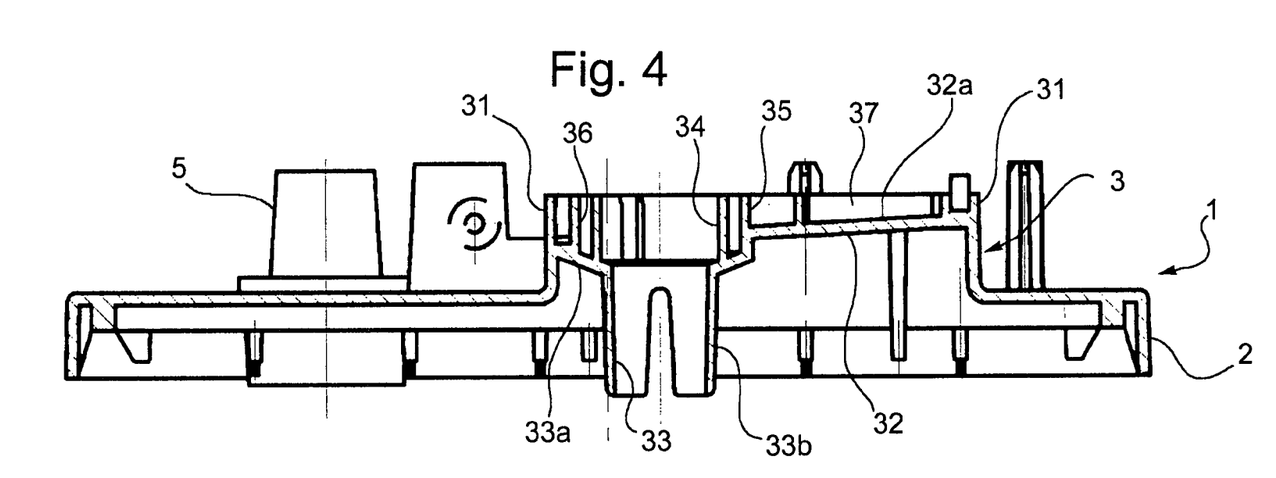
FIG. 4 is a section through the main element of the lid of FIG. 3, taken on the line IV-IV of that drawing.

Reference will now be made to FIGS. 3 and 4 which show solely the main lid 1, prior to assembly with the secondary lid 3.

The raised portion or lower half-shell 3 of the main lid 1 is surrounded by a peripheral wall 31 extending vertically from the body of the lid 1. In the portion delimited by the wall 31, the raised portion 3 has a base wall 32 which is disposed at a substantially raised level relative to the remaining portion of the lid 1. A plurality of aligned holes 33 are formed in the base wall 32 and are arranged in a manner corresponding to the cells of the battery (not shown) that is to be closed by the lid 1. The holes 33 are funnel-shaped with a wall portion 33a of lesser gradient which extends downwards from the base wall 32 of the raised portion 3 and a substantially vertical wall portion 33b which extends downwards from the wall portion of lesser gradient 33a. The base wall 32 of the raised portion 3 has an inclined upper surface having a downward gradient from the peripheral portion 31 towards the hole 33.

Around each hole 33 there is a plurality of substantially circumferential, concentric walls 34, 35. In the embodiment shown, for each hole 33, there are two of these concentric walls 34, 35 extending substantially vertically from the wall portion 33a of lesser gradient of the hole 33, that is, a radially inner circumferential wall 34 which directly faces the hole 33 and a radially outer circumferential wall 35 which is connected to the base wall 32 of the raised portion 3. The walls 34 and 35 thus define a circumferential space 36 interposed between them.

Figure 5:
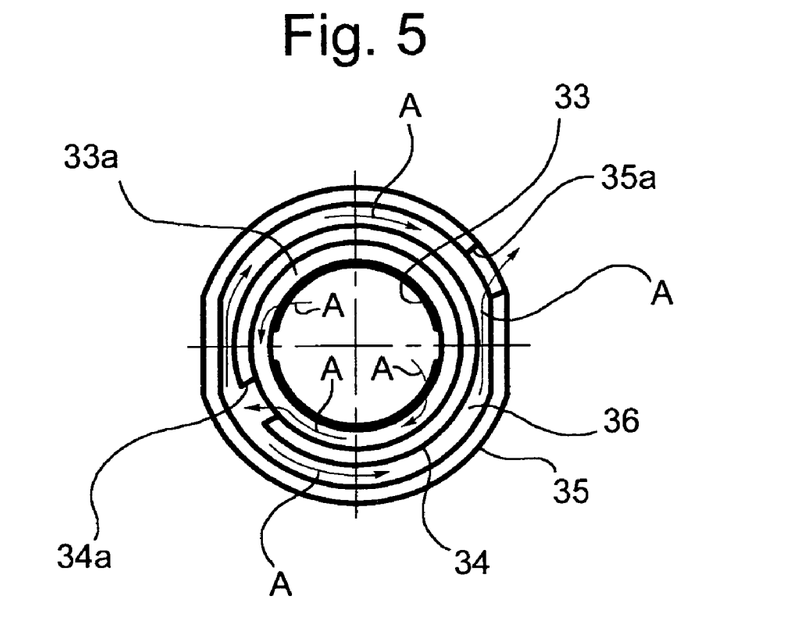
FIG. 5 is an enlarged view of a detail of the main element of the lid of FIG. 3 indicated by the arrow V of that drawing.

As is shown more clearly in FIG. 5, a notch or passageway 34a formed in the radially inner wall 34 puts the hole 33 into flow communication with the space 36. A notch or passageway 35a formed in the radially outer wall 35 in a non-aligned position and preferably diametrally opposite the passageway 34a puts the space 36 into flow communication with the lower portion of the main chamber 6.

With reference to FIG. 3, a plurality of walls or partitions 37, 38, 39 also extend from the base wall 32 of the raised portion 3 inside the chamber 6.

In particular, transverse walls 37 interposed between each hole 33 and the adjacent hole 33 extend transversely relative to the raised portion 3 so as to connect opposite sides of the peripheral wall 31 thus dividing the lower portion of the main chamber 6 into lower subchamber portions 6a, 6b, 6c, 6d, 6e, 6f. In each subchamber 6a, 6b, 6c, 6d, 6e, 6f there is a respective hole 33. At the ends remote from those which are adjacent the respective holes 33, the transverse walls 37 have notches or passageways 37a for putting the lower portion of each subchamber 6a, 6b, 6c, 6d, 6e, 6f into flow communication with the adjacent subchamber.

In each subchamber there is also a central wall 38 which extends with a meandering shape in a mainly transverse direction relative to the raised portion 3. Each central wall 38 thus divides the respective lower subchamber portion 6a, 6b, 6c, 6d, 6e, 6f into two main portions. Each central wall 38 is connected at one end to the radially outer wall 35 of the respective hole 33 and at the other end forms at least one loop 38a.

In each subchamber 6a, 6b, 6c, 6d, 6e, 6f there is also an end wall 39 which extends in a substantially longitudinal direction relative to the raised portion 3. Each end wall 39 extends between the two transverse walls 37, 37 (or between one transverse wall 37 and a transverse portion of the peripheral wall 31) of the respective subchamber. The end walls 39 are also arranged between the hole 33 and the passageway 37a of the transverse wall 37 of the respective subchamber so that, together, they define, with the adjacent longitudinal portion of the peripheral wall 31, a channel 39a extending along the entire length of the raised portion 3. A passageway or notch 39b formed in each of the end walls 39 puts the channel 39a into flow communication with the rest of the lower portion of the chamber 6. The end walls 39 are inclined inwards as seen in plan so as to slope from the walls 31 or 37 connected thereto, towards the respective passageways 39b. In other words, the channel 39a has a variable width which increases progressively in the region of the passageways 39b.

In the embodiment of the raised portion 3 of the lid 1 that is illustrated herein, the six subchambers 6a, 6b, 6c, 6d, 6e, 6f of the chamber 6 are arranged symmetrically with respect to a plane of symmetry x of the lid 1. The three subchambers 6a, 6b, 6c on one side of the plane x are reflectively symmetrical with respect to the three subchambers 6d, 6e, 6f on the other side of the plane x. The two subchambers 6a, 6f at the opposite ends have a wall configuration which is substantially different from that of the central subchambers 6b, 6c, 6d, 6e, for a reason which will be explained below.

Accordingly, only the subchamber 6a and the subchamber 6b which are disposed on the left in the lid shown in FIG. 3 will be described further below.

In the subchamber 6a, the central wall 38 has a wall branch 38b which connects it to the transverse wall 37. This branch 38b defines, with the loop 38a of the central wall 38 and a portion of the transverse wall 37, a lower discharge chamber portion 38c which is in flow communication with the rest of the subchamber 6a and the function of which will be explained below. The central wall 38 also has, beyond the loop 38a, a free end 38d which terminates in an offset position relative to the passageway 39b formed in the adjacent end wall 39. A plurality of compartments that are in flow communication and are arranged along a meandering path are thus formed in the subchamber 6a.

In the subchamber 6b, the central wall 38 is connected, beyond the loop 38a, to the transverse wall 37 that is closer to the axis of symmetry x. The end wall 39 has its passageway 39b in a position adjacent the above-mentioned transverse wall 37. In the vicinity of the loop 38a, a wall branch 37b projects from the transverse wall 37 that is farther from the axis x in a manner complementary to the loop 38a. A plurality of compartments that are in flow communication and are arranged along a meandering path are thus formed in the subchamber 6b.

The circumferential walls 34 and 35 around the hole 33, the transverse walls 37, the central walls 38, and the end walls 39 extend vertically so as to have upper edges level with the upper edge of the peripheral wall 31 of the raised portion 3 of the lid 1.

Figure 7:
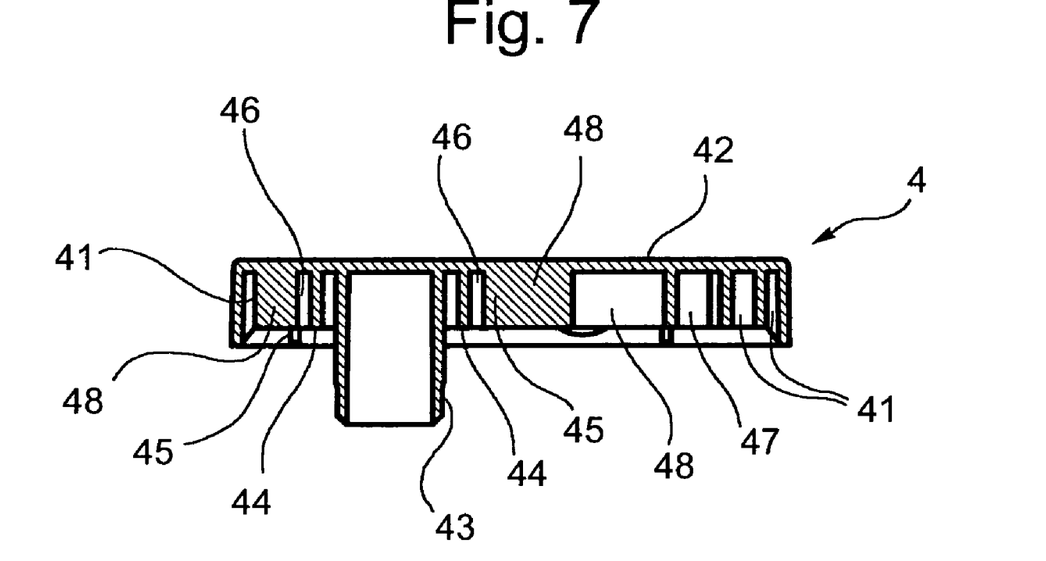
FIG. 7 is a section through the secondary element of the lid of FIG. 6, taken on the line VII-VII of that drawing.
Figure 8:
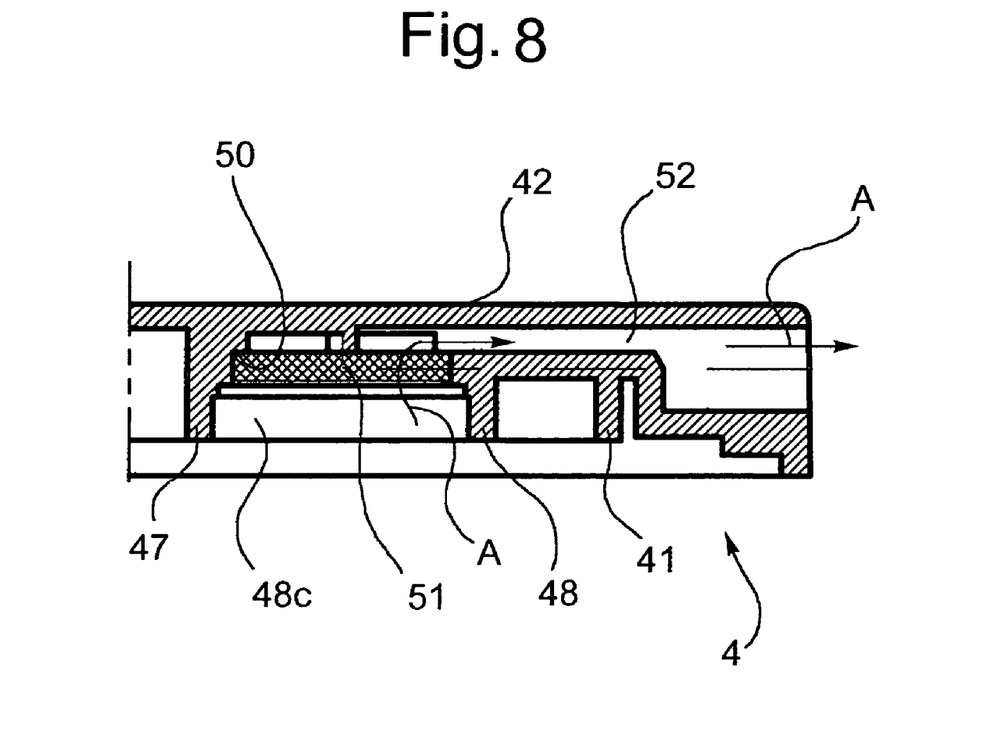
FIG. 8 is a section through a portion of the secondary element of the lid of FIG. 6, taken on the line VIII-VIII of that drawing.

Reference will now be made to FIGS. 6 to 8 which show solely the secondary lid 4, prior to assembly with the main lid 1. The secondary lid or upper half shell 4 has a peripheral wall 41 extending vertically from the body of the lid 4. In the portion delimited by the wall 41 the lid 4 has a base wall 42. A plurality of tubular plugs 43 extend from this base wall 42, each plug 43 having a body which is formed integrally with the secondary lid 4 and which is to be fitted in a respective complementary hole 33 of the raised portion 3 of the lid 1.

The tubular plugs 43 are therefore arranged in a manner corresponding to the cells of the battery (not sown) to be closed by the lid 1. In the condition in which the secondary lid 4 is mounted on the raised portion of the main lid 1, the peripheral wall 41 of the lid 4 is connected in a leaktight manner to and aligned with the peripheral wall 31 of the raised portion 3.

Around each plug 43 there is a plurality of substantially circumferential, concentric walls 44, 45. In the embodiment shown, for each plug 43, there are two concentric walls 44, 45 extending substantially vertically from the base wall 42, that is a radially inner circumferential wall 44 which directly faces the plug 43 and a radially outer circumferential wall 45 which is connected to the peripheral wall 41. The walls 44 and 45 thus define a circumferential space 46 interposed between them.

Figure 9:
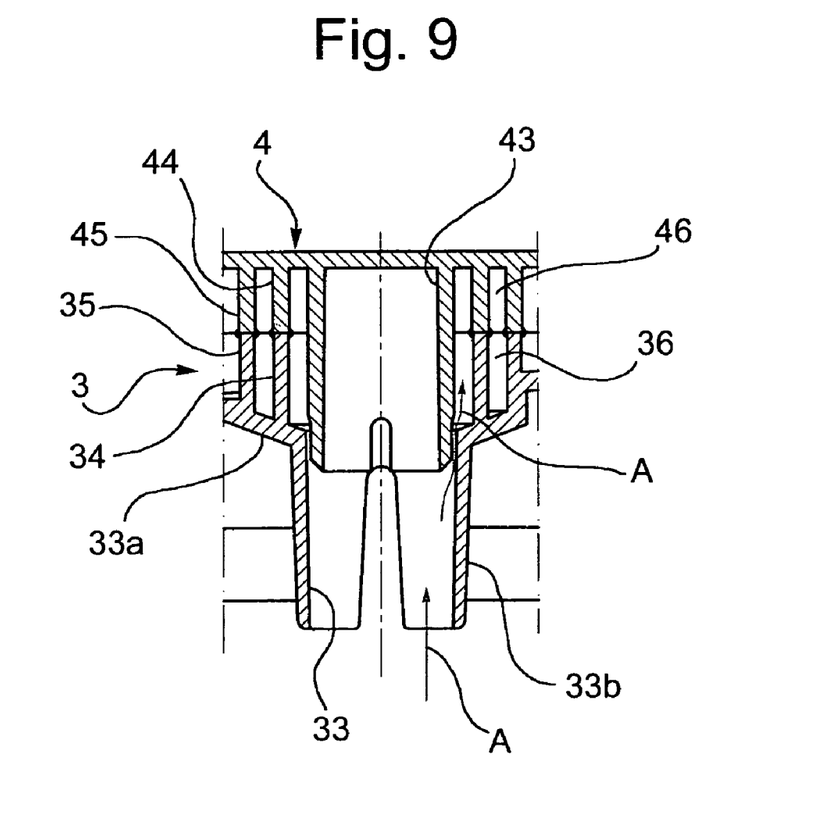
FIG. 9 is a section through a detail of the lid of FIG. 1 indicated by the arrow IX in FIG. 2.

As is shown more clearly in FIG. 9, in the condition in which the secondary lid 4 is mounted on the raised portion of the main lid 1, the inner and outer circumferential walls 44, 45 of the lid 4 are connected in a leaktight manner to and aligned with the inner and outer circumferential walls 34, 35, respectively, of the raised portion 3. The space 46 of the cover 4 is thus aligned with and connected to the space 36 of the raised portion 3 which in turn is in flow communication with the hole 33 through the passageway 34a in the radially inner wall 34 of the hole 33 and in flow communication with the main chamber 6 through the passageway 35a in the radially outer wall 35 of the hole 33.

With reference to FIG. 6 in particular, a plurality of walls or partitions 47, 48, 49 also extend from the base wall 42 of the secondary lid 4 in the chamber 6.

In particular, transverse walls 47 interposed between each plug 43 and the adjacent plug 43 extend transversely relative to the lid 4 so as to connect opposite sides of the peripheral wall 41. At the ends remote from those which are adjacent the respective plugs 43, the transverse walls 47 have notches or passageways 47a. In the condition in which the secondary lid 4 is mounted on the raised portion of the main lid 1, the transverse walls 47 of the lid 4 are connected in a leaktight manner to and aligned with the respective transverse walls 37 of the raised portion 3, thus dividing the main chamber 6 into the subchambers 6a, 6b, 6c, 6d, 6e, 6f. Each subchamber 6a, 6b, 6c, 6d, 6e, 6f is thus in flow communication with the adjacent subchamber through the passageways 37a of the transverse walls 37 of the raised portion 3 and through the passageways 47a of the transverse walls 47 of the lid 4, which passageways 47a are aligned with the passageways 37a.

In each subchamber there is also a central wall 48 which extends with a meandering shape in a mainly transverse direction relative to the secondary lid 4. Each central wall 48 thus divides the upper portion of the respective subchamber 6a, 6b, 6c, 6d, 6e, 6f into two main portions. Each central wall 48 connects the radially outer wall 45 of the respective plug 43 to the peripheral wall portion 41 adjacent thereto and also extends from the radially outer wall 45 on the side diametrically opposite the plug 43, forming at least one loop 48a.

In each subchamber 6a, 6b, 6c, 6d, 6e, 6f there is also an end wall 49 of the lid 4 which extends in a substantially longitudinal direction relative to the lid 4. Each end wall 49 extends between the two transverse walls 47, 47 (or between a transverse wall 47 and a transverse portion of the peripheral wall 41) of the respective subchamber. The end walls 49 are also arranged between the plug 43 and the passageway 47a of the transverse wall 47 of the respective subchamber so that, together, they define, with the adjacent longitudinal portion of the peripheral wall 41, a channel 49a extending along the entire length of the lid 4. In the condition in which the secondary lid 4 is mounted on the raised portion 3 of the main lid 1, the end walls 49 of the lid 4 are connected in a leaktight manner to and aligned with the respective end walls 39 of the raised portion 3 and the channel 49a of the lid 4 is aligned with the channel 39a of the raised portion 3. The duct delimited by the channel 39a of the raised portion 3 and by the channel 49a of the lid 4 is thus in flow communication with the rest of the chamber 6 through the passageways 39b formed in the end walls 39 of the raised portion 3. The end walls 49 of the lid 4 are inclined inwards as seen in plan, so as to slope from the walls 41 or 47 connected thereto towards the respective passageways 39b. In other words, the duct formed by the channel 49a and by the channel 39a has a variable width which increases progressively in the region of the passageways 39b.

In the embodiment of the secondary lid 4 described herein, the six subchambers 6a, 6b, 6c, 6d, 6e, 6f of the chamber 6 are arranged symmetrically with respect to a plane of symmetry x corresponding to the plane of symmetry of the lid 1. The three subchambers 6a, 6b, 6c on one side of the plane x are reflectively symmetrical with respect to the three subchambers 6d, 6e, 6f on the other side of the plane x. The two subchambers 6a, 6f at the opposite ends have a wall configuration which is substantially different from that of the central subchambers 6b, 6c, 6d, 6e for a reason which will be explained below.

Accordingly, only the subchamber 6a and the subchamber 6b which are disposed on the right in the lid shown in FIG. 6 will be described further below.

In the subchamber 6a, the central wall 48 has a wall branch 48b which connects it to the transverse wall 47. The branch 48b defines, with the loop 48a of the central wall 48 and a portion of the transverse wall 47, an upper discharge chamber portion 48c the function of which will be explained below. The central wall 48 also has, beyond the loop 48a, an end 48d which is connected to the adjacent transverse portion of the peripheral wall 41.

In the subchamber 6b, the central wall 48 is connected, beyond the loop 48a, to the transverse wall 47 that is closer to the axis of symmetry x. The central wall 48 is also connected, in the region of the loop 48a, to the transverse wall 47 that is farther from the axis of symmetry x. A wall branch 47b also projects from the transverse wall 47 farther from the axis x in the vicinity of the loop 48a and is connected to the central wall 48.

In the condition in which the lid 4 is mounted on the raised portion 3 of the main lid 1, the central walls 48 (and the respective loops 48a and branches 47b, 48b) of the lid 4 are aligned with and connected in a leaktight manner to the respective central walls 38 (and the respective loops 38a and branches 37b, 38b) of the raised portion 3. A plurality of compartments arranged along a meandering path are thus formed in each of the subchambers 6a-6f and are in flow communication with one another through the passageways defined by the peripheral wall 31, by the radially outer walls 35 of the holes 33, by the transverse walls 37, by the central walls 38, and by the end walls 39 of the raised portion 3.

For this purpose, the circumferential walls 44 and 45 around the plug 43, the transverse walls 47, the central walls 48, and the end walls 49 extend vertically so as to have lower edges level with the lower edge of the peripheral wall 41 of the secondary lid 4.

The upper discharge chamber portion 48c of the secondary lid 4, which is present in the subchambers 6a and 6f, defines a seat 50 for the mounting, for example, by ultrasound welding, of a porous pellet 51 of known type (shown only in FIG. 8) acting as a flame-stopper element. A breather duct 52 formed in the base wall 42 of the lid 4 puts the discharge chamber 38c, 48c into flow communication with the outside atmosphere through the porous pellet 51.

The walls 31, 34, 35, 37, 38, 39 of the raised portion of the main lid 1 and the walls 41, 44, 45, 47, 48, 49 of the secondary lid 4 together define a labyrinth structure having partitions arranged in a manner such as to force the fluids that pass through it to follow a tortuous path.

The arrows A in FIGS. 3, 5, 6, 8 and 9 show possible discharge paths for gases generated inside the battery.

The gases pass through the space between each tubular plug 43 and the wall 33b of the corresponding hole 33.

The gases then pass through the labyrinth structure, flowing around the radially outer walls 35 of the holes 33 after passing through the passageways 34a and 35a and flowing through the chambers between the partition walls. The gases then enter the discharge chamber 38c, 48c defined between the two half-shells 3 and 4 and can finally be discharged to the exterior through the duct 52.

A horizontal labyrinth is thus constructed in the chamber 6 according to the invention, allowing the battery to be tilted through 90° (from the vertical position) onto any of its four sides without the electrolyte reaching the porous pellets 51 disposed in the gas-discharge ducts within a short period of time. Leakages of electrolyte during incorrect handling or in the event of accidental tilting are thus prevented or at least reduced.

What is claimed is:

1. A lid for an accumulator battery, comprising:
   a substantially flat main closure element for closing a container of the battery, the closure element defining a plurality of holes to afford access to the interior of the battery container,
   a secondary closure element which is mounted on the main element and in which there is a plurality of plugs that are fitted in the holes of the main element of the lid, and
   at least one duct formed in at least one of the main and secondary elements, wherein the at least one duct is in flow communication with the holes, and is provided for the discharge of the gases that are generated inside the battery container,
   wherein the main and secondary closure elements together form a box-like structure defining a chamber which is in flow communication with the holes and inside which the main and secondary elements are connected to one another by a plurality of partitions that extend substantially perpendicularly relative to the plane in which the main element extends and are arranged to define a labyrinth chamber which connects the holes of the main element with the gas-discharge duct;
   wherein for each of the subchambers, the plurality of partitions comprises radially concentric inner and outer circumferential walls surrounding the hole and defining a circumferential space there between, the concentric inner and outer circumferential walls each having a passageway formed therein so that the circumferential space provides flow communication with the hole and the subchamber, wherein the passageways are positioned diametrically opposite one another;

wherein the plurality of partitions comprises transverse walls interposed between each hole and an adjacent hole and extending to divide the labyrinth chamber into a plurality of subchambers, each subchamber housing one of the holes of the plurality of holes, each of the subchambers being in separate flow communication with a channel extending along a side of the chamber in fluid communication with the at least one duct;

and wherein for each of the subchambers, the plurality of partitions comprises a central wall extending with a meandering shape in a direction substantially parallel to the transverse walls, the central wall being connected to the radially outer circumferential wall of the subchamber and to a respective one of the transverse walls to divide the subchamber into an open space in direct flow communication with the channel, and a blind space in flow communication with the channel through the open space, the passageway of the outer circumferential wall facing the blind space of the subchamber.

2. A lid according to claim 1 wherein the main and secondary elements have respective projections, the projections of the secondary element being arranged in corresponding manner to the projections of the main element and being aligned therewith and connected in a leaktight manner thereto so as to form the partitions of the labyrinth chamber.

3. A lid according to claim 2 wherein the partitions have passageways for fluids, the passageways being formed in the projections of the main element.

4. A lid according to claim 1 wherein the main element of the lid forms a base wall of the labyrinth chamber having an inclined upper surface with a downward gradient from the periphery towards the holes.

5. A lid according to claim 1 wherein the main element of the lid has, in the region of the labyrinth chamber, a raised portion which, together with the secondary element, forms the box-like structure.

6. A lid according to claim 1 wherein the plurality of partitions further comprises end walls extending transversely relative to the transverse walls and arranged so as to define a channel communicating with the subchambers.

7. A lid according to claim 1 wherein the plugs are formed integrally with the secondary element of the lid.

8. A lid according to claim 1 wherein the secondary element is welded, preferably heat-sealed, onto the main element.

9. An accumulator battery comprising a lid, the lid comprising:

a substantially flat main closure element for closing a container of the battery, the closure element defining a plurality of holes to afford access to the interior of the battery container, a secondary closure element mounted on the main element and in which there is a plurality of plugs that are fitted in the holes of the main element of the lid, and at least one duct which is formed in at least one of the main and secondary elements, is in flow communication with the holes, and is provided for the discharge of the gases that are generated inside the battery container, wherein the main and secondary closure elements together form a box-like structure defining a chamber which is in flow communication with the holes and inside which the main and secondary elements are connected to one another by a plurality of partitions that extend substantially perpendicularly relative to the plane in which the main element extends and are arranged in a manner such as to define a labyrinth chamber which connects the holes of the main element with the gas-discharge duct;

wherein for each of the subchambers, the plurality of partitions comprises radially concentric inner and outer circumferential walls surrounding the hole and defining a circumferential space there between, the concentric inner and outer circumferential walls each having a passageway formed therein so that the circumferential space provides flow communication with the hole and the subchamber, wherein the passageways are positioned diametrically opposite one another;

wherein the plurality of partitions comprises transverse walls interposed between each hole and an adjacent hole and extending to divide the labyrinth chamber into a plurality of subchambers, each subchamber housing one of the holes of the plurality of holes, each of the subchambers being in separate flow communication with a channel extending along a side of the chamber in fluid communication with the at least one duct;

and wherein for each of the subchambers, the plurality of partitions comprises a central wall extending with a meandering shape in a direction substantially parallel to the transverse walls, the central wall being connected to the radially outer circumferential wall of the subchamber and to a respective one of the transverse walls to divide the subchamber into an open space in direct flow communication with the channel, and a blind space in flow communication with the channel through the open space, the passageway of the outer circumferential wall facing the blind space of the subchamber.

* * * * *